(12) United States Patent
Buckland et al.

(10) Patent No.: US 9,279,374 B2
(45) Date of Patent: Mar. 8, 2016

(54) METHODS AND SYSTEMS FOR SURGE CONTROL

(71) Applicant: Ford Global Technologies, LLC, Dearborn, MI (US)

(72) Inventors: Julia Helen Buckland, Commerce Township, MI (US); Robert Andrew Wade, Plymouth, MI (US); Gregory Patrick McConville, Ann Arbor, MI (US); Kevin Payne, Belleville, MI (US); Joseph Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 297 days.

(21) Appl. No.: 13/965,725

(22) Filed: Aug. 13, 2013

(65) Prior Publication Data

US 2015/0047605 A1 Feb. 19, 2015

(51) Int. Cl.

| F02B 37/16 | (2006.01) |
|---|---|
| F02B 37/12 | (2006.01) |
| F02D 41/00 | (2006.01) |
| F02D 41/10 | (2006.01) |
| F02D 41/18 | (2006.01) |

(52) U.S. Cl.
CPC .......... *F02D 41/0007* (2013.01); *F02B 37/127* (2013.01); *F02B 37/164* (2013.01); *F02B 2037/125* (2013.01); *F02D 41/10* (2013.01); *F02D 41/18* (2013.01)

(58) Field of Classification Search
CPC .. F02D 41/0007; F02B 37/164; F02B 37/127; F02B 2037/125
USPC .......... 123/403, 563, 564, 561, 516, 518–520
See application file for complete search history.

(56) References Cited

U.S. PATENT DOCUMENTS

| 3,614,259 A | 10/1971 | Neff |
|---|---|---|
| 4,351,154 A | 9/1982 | Richter |
| 4,389,845 A | 6/1983 | Koike |

(Continued)

FOREIGN PATENT DOCUMENTS

| DE | 102009006359 A1 * | 7/2010 | .............. F02D 23/00 |
|---|---|---|---|
| EP | 0435357 A1 | 7/1991 | |

(Continued)

OTHER PUBLICATIONS

Ulrey, Joseph Norman et al., "Methods and Systems for Boost Control," U.S. Appl. No. 13/965,901, filed Aug. 13, 2013, 54 pages.

(Continued)

*Primary Examiner* — Mahmoud Gimie
(74) *Attorney, Agent, or Firm* — Julia Voutyras; Alleman Hall McCoy Russell & Tuttle LLP

(57) ABSTRACT

Methods and systems are provided for recirculating compressed air across a compressor through a high flow and a low flow compressor recirculation path. Flow through the recirculation paths is controlled via respective valves and valve opening is adjusted based on a throttle mass flow so as to maintain a compressor flow rate at or above a surge constrained flow rate. By maintaining a sufficiently high compressor flow rate during steady state and transient conditions, the compressor state can be maintained outside a surge region.

19 Claims, 5 Drawing Sheets

(56) References Cited

U.S. PATENT DOCUMENTS

| | | | |
|---|---|---|---|
| 4,443,153 A | | 4/1984 | Dibelius |
| 4,544,326 A | | 10/1985 | Nishiguchi et al. |
| 4,774,812 A | * | 10/1988 | Hitomi et al. ............. 60/611 |
| 4,949,276 A | | 8/1990 | Staroselsky et al. |
| 6,079,210 A | | 6/2000 | Pintauro et al. |
| 6,408,833 B1 | | 6/2002 | Faletti |
| 6,565,479 B2 | | 5/2003 | Fattic et al. |
| 6,681,171 B2 | | 1/2004 | Rimnac et al. |
| 6,725,847 B2 | | 4/2004 | Brunemann et al. |
| 6,983,596 B2 | | 1/2006 | Frankenstein et al. |
| 6,983,597 B2 | * | 1/2006 | Wild et al. ............. 60/611 |
| 7,137,253 B2 | | 11/2006 | Furman et al. |
| 7,163,005 B2 | | 1/2007 | Tussing et al. |
| 7,640,744 B2 | | 1/2010 | Rollinger et al. |
| 8,161,746 B2 | | 4/2012 | Ulrey et al. |
| 8,267,069 B2 | | 9/2012 | Hsia et al. |
| 8,286,616 B2 | | 10/2012 | Clarke et al. |
| 8,287,233 B2 | | 10/2012 | Chen |
| 8,333,071 B2 | | 12/2012 | Oakley et al. |
| 2006/0196182 A1 | | 9/2006 | Kimoto et al. |
| 2008/0163855 A1 | | 7/2008 | Matthews et al. |
| 2009/0071150 A1 | | 3/2009 | Joergl et al. |
| 2009/0255517 A1 | * | 10/2009 | Ishikawa et al. ............. 123/562 |
| 2011/0023842 A1 | | 2/2011 | Kurtz |
| 2011/0094480 A1 | | 4/2011 | Suhocki et al. |
| 2011/0132331 A1 | * | 6/2011 | Pursifull ............. 123/478 |
| 2012/0014812 A1 | | 1/2012 | Blaiklock et al. |
| 2012/0297765 A1 | | 11/2012 | Vigild et al. |

FOREIGN PATENT DOCUMENTS

| | | |
|---|---|---|
| EP | 2317111 A1 | 5/2001 |
| EP | 1124047 A1 | 8/2001 |
| EP | 2426340 A1 | 3/2012 |
| EP | 2562397 A1 | 8/2012 |

OTHER PUBLICATIONS

Banker, Adam Nathan et al., "Methods and Systems for Torque Control," U.S. Appl. No. 13/965,917, filed Aug. 13, 2013, 46 pages.

McConville, Gregory Patrick et al., "Methods and Systems for Boost Control," U.S. Appl. No. 13/965,938, filed Aug. 13, 2013, 40 pages.

Ulrey, Joseph Norman et al., "Methods and Systems for Boost Control," U.S. Appl. No. 13/965,952, filed Aug. 13, 2013, 40 pages.

McConville, Gregory Patrick et al., "Methods and Systems for Boost Control," U.S. Appl. No. 13/965,963, filed Aug. 13, 2013, 45 pages.

Styles, Daniel Joseph et al., "Methods and Systems for Boost Control," U.S. Appl. No. 13/965,698, filed Aug. 13, 2013, 43 pages.

Jankovic, Mrdjan J. et al., "Methods and Systems for Boost Control," U.S. Appl. No. 13/829,648, filed Mar. 14, 2013, 39 pages.

Ulrey, Joseph Norman et al., "Methods and Systems for Condensation Control," U.S. Appl. No. 13/965,751, filed Aug. 13, 2013, 36 pages.

Ulrey, Joseph Norman et al., "Methods and Systems for Condensation Control," U.S. Appl. No. 13/965,763, filed Aug. 13, 2013, 37 pages.

Ulrey, Joseph Norman et al., "Methods and Systems for EGR Control," U.S. Appl. No. 13/966,006, filed Aug. 13, 2013, 56 pages.

Ulrey, Joseph Norman et al., "Methods and Systems for EGR Control," U.S. Appl. No. 13/965,794, filed Aug. 13, 2013, 56 pages.

Byrd, Kevin Durand et al., "Multi-Staged Wastegate," U.S. Appl. No. 13/570,025, filed Aug. 8, 2012, 26 pages.

Ulrey, Joseph Norman et al., "Method and System for Fuel Vapor Management," U.S. Appl. No. 13/660,884, filed Oct. 25, 2012, 38 pages.

* cited by examiner

METHODS AND SYSTEMS FOR SURGE CONTROL

FIELD

The present application relates to methods and systems for using compressor recirculation flow to improve surge control.

BACKGROUND AND SUMMARY

Engine systems may be configured with boosting devices, such as turbochargers or superchargers, for providing a boosted aircharge and improving peak power outputs. The use of a compressor allows a smaller displacement engine to provide as much power as a larger displacement engine, but with additional fuel economy benefits. However, compressors are prone to surge. For example, when an operator tips-out of an accelerator pedal, an engine intake throttle closes, leading to reduced forward flow through the compressor, and a potential for surge. As such, surge can lead to NVH issues such as undesirable noise from the engine intake system. For example, during hard surge, the compressor allows air to momentarily backflow through the compressor resulting in rapid pressure oscillations, while during soft surge, smaller pressure oscillations are experienced.

To address either form of compressor surge, engine systems may include a compressor recirculation valve coupled across the compressor to enable rapid decaying of boost pressure. One example of such a compressor recirculation valve is shown by Blaiklock et al. in US 2012/0014812. Therein, the compressor recirculation valve is an open/closed type of valve that is maintained closed during steady-state engine operation and actuated open in response to any indication of surge. By opening the valve, a portion of air discharged from the compressor is recirculated to the compressor inlet.

However the inventors herein have identified potential issues with such an approach. As one example, the valve of Blaiklock may be ineffective for managing soft surge. This is due, in part, because of the relatively smaller instability of compressor operation during soft surge. In particular, unlike hard surge, soft surge tends to occur during otherwise steady-state conditions when compressor speed lines on a compressor map have a positive slope. In this region of the compressor map, soft surge generates relatively small amplitude oscillations in pressure and flow. As a result, soft surge is typically not addressed by opening a compressor recirculation valve but by lowering the engine torque curve such that engine operating conditions lie outside of the areas of the compressor map where soft surge tends to occur. As such, this can lead to compromises in driveability and performance, particularly for highly downsized engine configurations and/or at high altitudes and ambient temperatures. On the other hand, if a compressor recirculation valve were opened in response to soft surge, driver torque demand could not be maintained.

In one example, some of the above issues may be addressed by a method for a boosted engine comprising: adjusting flow through each of a first higher flow compressor recirculation path and a second lower flow compressor recirculation path based on a throttle mass flow to maintain a compressor flow rate at or above a threshold flow rate, the second recirculation passage positioned in parallel to the first recirculation passage. In this way, a compressor flow rate can be maintained above a flow rate at the hard surge line and compressor operation may be kept outside a surge region during steady-state as well as transient engine operating conditions.

In one example, an engine system may include a compressor having each of a first compressor recirculation path and a second compressor recirculation path coupling an outlet of a charge air cooler to the compressor inlet. In alternate embodiments, at least one of the recirculation paths may couple an outlet of the compressor to the compressor inlet. The first and second recirculation paths may be positioned in parallel to each other across the compressor. Flow through each recirculation path may be controlled via respective on/off valves. In addition, the second recirculation path may include a flow restriction, in the form of an orifice or a venturi for example, such that compressor recirculation flow through the second recirculation path is at a lower flow rate than compressor recirculation flow through the first recirculation path. An engine controller may be configured to continually adjust a position of the first and second valves, during steady-state and transient engine operating conditions, based on changes in air flow through an intake throttle so as to maintain a compressor flow rate at or above a surge constrained flow rate (that is, a compressor flow rate at a surge limit (e.g., hard surge line) of the compressor). In one example, the throttle mass flow rate may be determined based on the output of a manifold airflow (MAF) sensor, while the surge constrained compressor flow rate is determined based on the compressor surge limit.

If the throttle mass flow is higher than the desired (surge constrained) compressor flow rate, one or more of the compressor recirculation valves may be maintained closed. For example, both valves may be held closed to decrease recirculation flow. Alternatively, the first valve may be held closed while the second valve is left open so that a smaller portion of compressor recirculation flow is kept to provide an improved surge margin. If the throttle mass flow suddenly drops (e.g., during a tip-out) or if the steady-state throttle mass flow is lower than the desired compressor flow rate, both valves may be opened to increase the recirculation flow. Alternatively, the first valve may be opened while the second valve is left closed so that there is a larger portion of compressor recirculation flow. In either case, the flow rate through the compressor is increased, improving the surge margin.

In this way, by adjusting flow through both the compressor recirculation paths based on a throttle mass flow, a compressor flow rate can be kept sufficiently high. This enables compressor operation during steady-state as well as transient operating conditions to remain outside a surge region (e.g., outside a hard surge region and a soft surge region). As such, this allows both hard surge and soft surge to be better addressed. By improving the surge margin under all engine operating conditions, surge related NVH issues and component damage issues are reduced. In addition, soft surge can be addressed without degrading driveability and engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
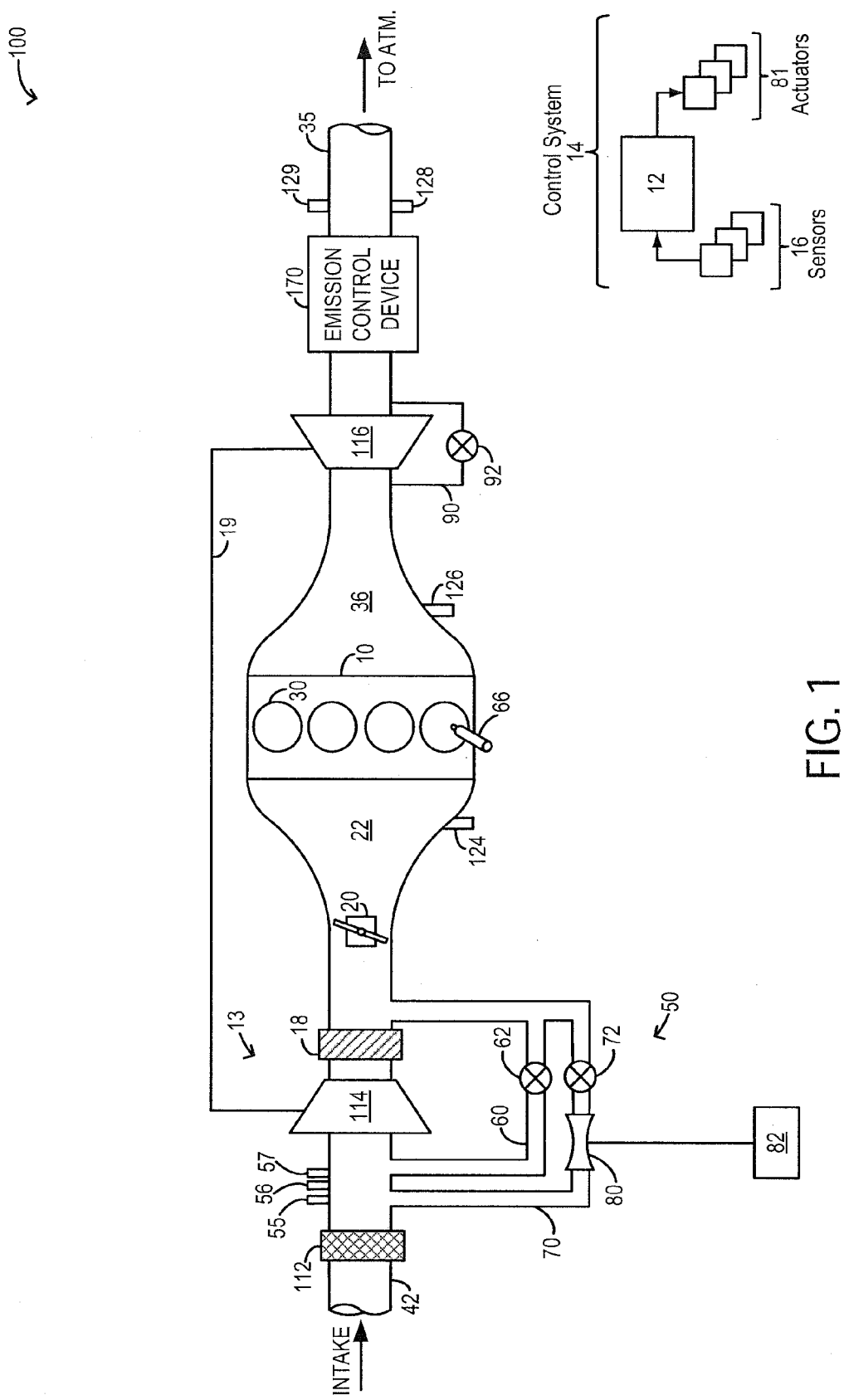
FIGS. 1-2 show example embodiments of a boosted engine system including a compressor recirculation valve.
Figure 2:
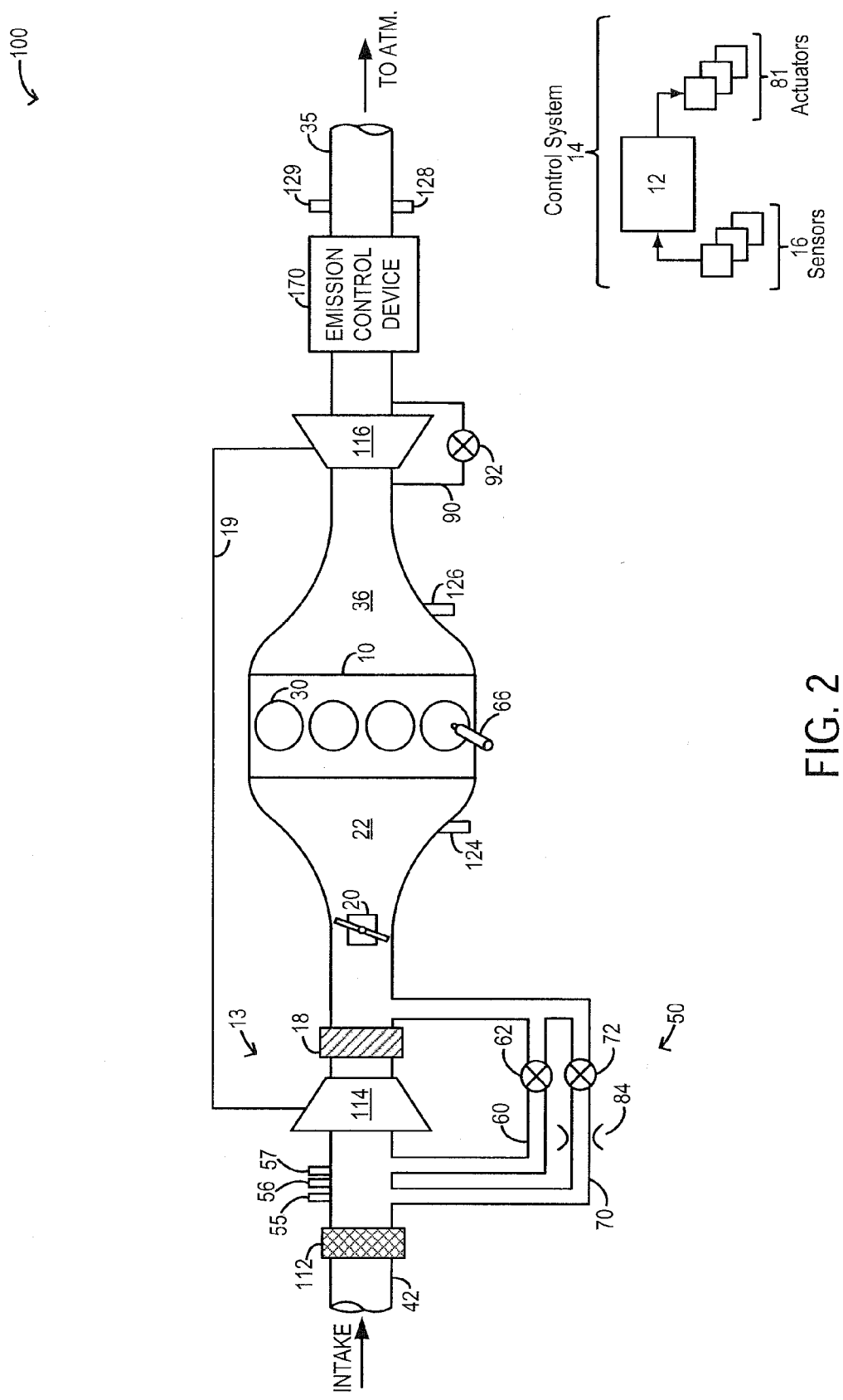

The following description relates to systems and methods for reducing compressor surge in a boosted engine system, such as the system of FIGS. 1-2. A controller may be configured to perform a control routine, such as the routine of FIG. 4, to adjust compressor recirculation flow through each of a high flow recirculation path and a low flow recirculation path to the compressor inlet. The controller may adjust the position of one or more valves coupled to the recirculation passages based on engine operating conditions and changes to throttle flow to maintain the compressor flow rate at or above a surge constrained flow rate. The controller may refer to a compressor map, such as the map of FIG. 3, to identify hard and soft surge limits and determine surge constrained flow rates at those limits. Example valve adjustments are described with reference to FIG. 5. In this way, a margin to surge is improved.

FIGS. 1-2 schematically show aspects of an example engine system 100 including an engine 10. As such, since FIGS. 1-2 depict example embodiments of the same engine system, components introduced in FIG. 1 are not repeated in the description of FIG. 2. In the depicted embodiments, engine 10 is a boosted engine coupled to a turbocharger 13 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, however, the compressor is a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a monoscroll type or a variable geometry turbocharger (VGT), where turbine geometry is actively varied as a function of engine speed.

As shown in FIG. 1, compressor 114 is coupled, through charge-air cooler (CAC) 18 (herein also referred to as an intercooler) to throttle valve 20. Throttle valve 20 is coupled to engine intake manifold 22. From the compressor, the compressed air charge flows through the charge-air cooler 18 and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 124 and the flow rate of air charge entering the intake manifold can be estimated using this measurement.

One or more sensors may be coupled to an inlet of compressor 114. For example, a temperature sensor 55 may be coupled to the inlet for estimating a compressor inlet temperature. A pressure sensor 56 may be coupled to the inlet for estimating a compressor inlet pressure, and a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, etc.) may be inferred based on engine operating conditions.

During selected conditions, such as during a tip-out, when throttle angle is reduced, compressor surge can occur. This is due to the reduction in forward flow through the compressor, increasing the propensity for surge. In addition, surge can lead to NVH issues such as undesirable noise from the engine intake system. To relieve boost pressure and reduce compressor surge, at least a portion of the aircharge compressed by compressor 114 may be recirculated to the compressor inlet via a compressor recirculation system 50. This allows higher compressor flow, which can alleviate surge.

Compressor recirculation system 50 may include a first compressor recirculation path 60 for recirculating compressed air across the compressor, and a second compressor recirculation path 70, positioned in parallel to first recirculation path 60, for recirculating compressed air across the compressor. In particular, each of the first and second compressor recirculation paths may be configured for recirculating compressed airflow from downstream of charge-air cooler 18 and upstream of intake throttle 20 to the compressor inlet. In this way, both compressor recirculation paths may recirculate cooled compressed air to the compressor inlet. However, in alternate embodiments, the compressor recirculation paths may be configured for recirculating compressed airflow from upstream of the charge air cooler to the compressor inlet. Flow through first compressor recirculation path 60 may be controlled by adjusting a first valve 62 coupled in the first recirculation path while flow through second compressor recirculation path 70 may be controlled by adjusting a second valve 72 coupled in the second compressor recirculation path. In the depicted example, each of the first and second valves 62, 72 are on/off valves wherein a position of the valve is variable between a fully-closed position and a fully-open position. However, in alternate embodiments, one or more of the valves may be continuously variable valves wherein a position of the valve is continuously variable from a fully closed position to a fully open position. For example, one or more of the valves may be configured as a butterfly or poppet valve.

In the depicted example, valves 62 and 72 may be electrically actuated valves. However, in alternate embodiments, the valves may be pneumatically controlled with either pressure or vacuum actuation.

Second compressor recirculation path 70 may include a flow restriction downstream of second valve 72. In the embodiment of FIG. 1, the flow restriction is a venturi 80 (or vacuum tap). In the embodiment of FIG. 2, the flow restriction is an orifice 84. Due to the presence of the flow restriction, second compressor recirculation path 70 may constitute a lower flow compressor recirculation route while first compressor recirculation path 60 may constitute a higher flow compressor recirculation route.

In the embodiment of FIG. 1 where the second compressor recirculation path includes venturi 80, compressor recirculation flow through the second compressor recirculation path may be opportunistically harnessed for generating vacuum. In particular, while flowing recirculation flow through the second recirculation path, a vacuum may be drawn at the neck of the venturi 80. The drawn vacuum may be stored in a vacuum storage device. Alternatively, venturi 80 may be coupled to an engine vacuum consumption device 82 and the drawn vacuum may be used for actuation of vacuum consumption device 82. In one example, vacuum consumption device 82 may be a brake booster and the vacuum drawn at the venturi is used to actuate the brake booster to assist vehicle braking. In another example, vacuum consumption device 82 may be a fuel vapor canister and the vacuum drawn at the venturi may be applied to the fuel vapor canister during a canister purging condition.

As elaborated herein, based on operating conditions, the compressor recirculation system may be operated in one of four modes to vary a recirculation flow across the compressor. As used herein, the recirculation flow across the compressor refers to a net flow from downstream of the charge air cooler to the compressor inlet via the first and second recirculation paths. The recirculation flow across the compressor may be continuously adjusted based on changes to throttle mass flow during steady-state conditions as well as transient conditions. By continually varying the recirculation flow based on a throttle mass flow rate, a flow rate through the compressor can be kept sufficiently high. In particular, the compressor flow rate can be maintained at or above a surge constrained compressor flow rate. As such, this allows a surge margin to be improved and the compressor operation state to be held outside of a hard surge region and a soft surge region (for example, in a no surge region). In alternate embodiments, however, the recirculation flow across the compressor may refer to a net flow from upstream of the charge air cooler to the compressor inlet.

The various operating modes may include, for example, a first mode of operation selected during a first condition where the system operates with the first valve open and the second valve closed. The first condition may include, for example, moderate torque reductions. The system may also be operated in a second mode (e.g., during a second condition) with the first valve closed and the second valve open. The second condition may include, for example, low speed high load conditions where surge margin is low. The system may be further operated in a third mode (e.g., during a third condition) with each of the first and second valves open. The third condition may include, for example, large, aggressive torque reduction. Finally, the system may also be operated in a fourth mode (e.g., during a fourth condition) with each of the first and second valves closed. The fourth condition may include, for example, high speed/load conditions that require compressor operation significantly away from the surge regions. As elaborated at FIG. 4, a controller may select between the modes based on a desired compressor recirculation flow rate.

A wastegate actuator 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce boost pressure. However, due to the dynamics of the turbocharger, the effects of compressor recirculation valve adjustments on reducing surge may be faster than the effects of the wastegate adjustments.

Figure 3:
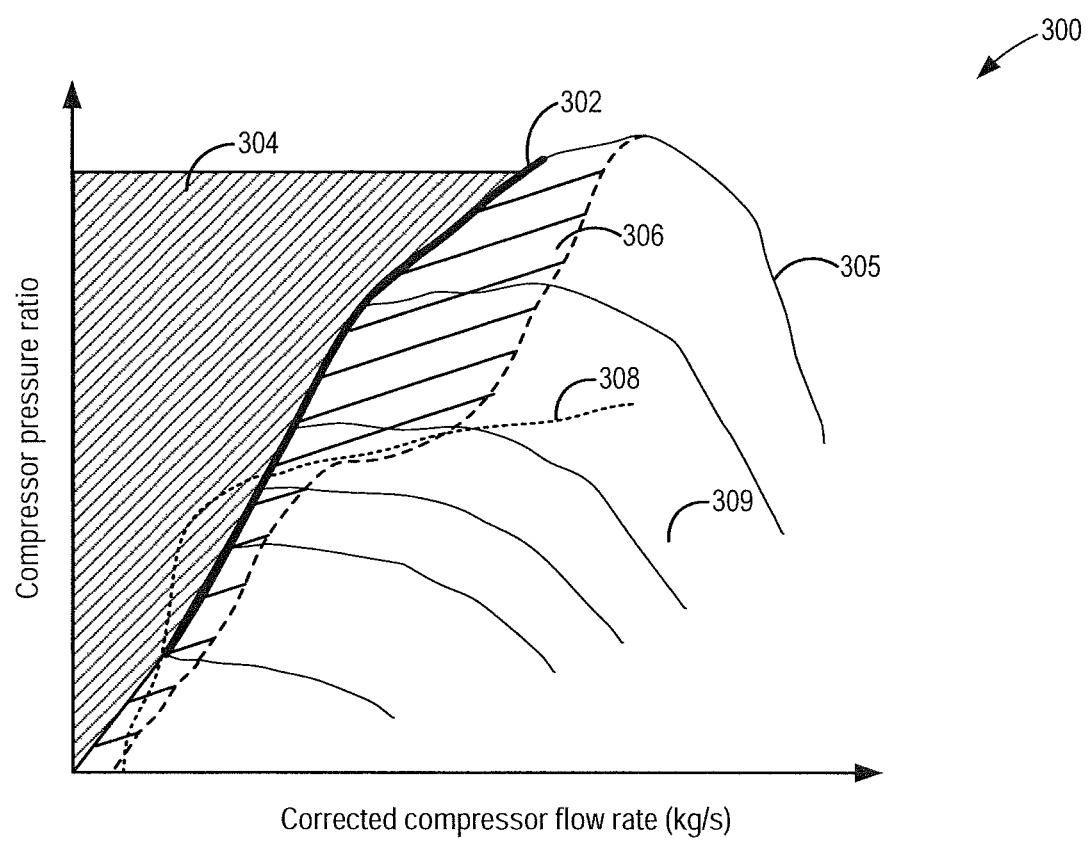
FIG. 3 shows a compressor map displaying hard and soft surge limits.

Engine controller 12 may use a map, such as the map of FIG. 3, to identify whether the compressor is operating in or around a surge region. In particular, map 300 of FIG. 3 shows a change in compressor pressure ratio (along the y-axis) at different compressor flow rates (along the x-axis). The map includes contour lines 305 representing constant compressor speed. Line 302 shows a hard surge line (or hard surge limit) for the given operating conditions. Compressor operation to the left of hard surge line 302 results in operation in a hard surge region 304 (shaded region). As such, compressor operation in hard surge region 304 results in objectionable NVH and potential degradation of engine performance. Hard surge can occur during transient conditions when the engine airflow requirement suddenly decreases, such as during an operator pedal tip-out. This condition typically requires a rapid decrease in compressor outlet pressure and/or sufficient compressor flow rate to avoid surge. When in this region, each of the first and second valves may be opened to move compressor operation away from the hard surge limit 302, specifically, to the right of surge limit 302.

Line 308 (dashed line) illustrates an example change in compressor operation during an operator pedal tip-out. Therein, the rapid closing of the intake throttle causes flow through the compressor to decrease very quickly while the compressor exit pressure rises or decreases relatively slowly. This forces compressor operation to the left on line 302, into hard surge region 304, for an extended period. When the compressor exit pressure gradually decreases, the pressure differential across the compressor reduces. As a result, compressor operation eventually moves to the right of line 302, first into soft surge region 306 and subsequently into no surge region 309. However, the extended period in the hard surge region (and soft surge region) can cause issues such as NVH issues, as well as compressor hardware damage. During such conditions, one or more (e.g., both) of the first and second compressor recirculation valves can be opened to more rapidly move compressor operation to the right of the surge line.

Soft surge can occur in soft surge region 306 of the compressor map during an operator pedal tip-out, or steady-state conditions, where the engine requires maintaining boosted induction pressure. Herein, increasing flow through the compressor without dropping boosted pressure is desired. To do so, at least one of the first and second valves may be maintained open so that at least some increase in airflow through the compressor is enabled. Wastegate is moved more towards the closed position to avoid reducing the boost pressure, and therefore delivered torque. Further, an alternate action, such as changing a transmission gear schedule, may be performed to keep compressor operation away from soft surge region 306.

As such, it would be desirable for compressor operation to remain outside of both hard surge region 304 and soft surge region 306 (that is, in no surge region 309) during engine operation whenever possible, including during steady-state and transient engine operating conditions. In addition, since the exact compressor state (which is defined by compressor flow, compressor pressure ratio, and compressor rotational speed) at which hard or soft surge occurs can vary with various noise factors (e.g., part to part variability), it may be desirable to always maintain at least some margin to surge under all engine operating conditions to enable surge to be avoided.

The inventors herein have recognized that one approach to improve the surge margin under all engine operating conditions and maintain the compressor state in the no surge region includes controlling the compressor flow rate such that it is kept at or above a compressor flow rate at the hard surge line (line 302 of FIG. 3). In particular, the flow rate may be adjusted so that equation (1) is satisfied:

$$\dot{m}_c \geq \dot{m}_{SL} \quad (1)$$

wherein $\dot{m}_c$ is the compressor mass flow and $\dot{m}_{SL}$ is a surge constrained compressor flow (that is, a compressor flow rate at the hard surge line). As such, $\dot{m}_{SL}$ is defined to include the appropriate margin to account for part to part variability and/or other noise factors that may affect the compressor state at which hard or soft surge may occur.

The inventors herein have observed that prior to hard surge, the flow rate through the compressor is approximately the same as that through the throttle. In other words, the flow through the compressor is the same as the flow out of the boost volume. Therefore, during a tip out, opening one or more of the recirculation valves 62, 72 to maintain the flow rate out of the boost volume will maintain the flow rate through the compressor. Thus, a controller may be configured to adjust the recirculation flow so that equation (2) is satisfied:

$$\dot{m}_{thr}+\dot{m}_r \geq \dot{m}_{SL} \qquad (2)$$

wherein $\dot{m}_{thr}$ is the primary throttle mass flow and $\dot{m}_r$ is the recirculation mass flow (that is, mass flow recirculated across the compressor via the first and/or second compressor recirculation paths). As such, recirculation flow may be adjusted so that equation (2) is satisfied during steady-state and transient operating conditions. As a result, there may be engine operating conditions that require no compressor recirculation flow to robustly avoid the hard and/or soft surge regions while other engine operating conditions may require continuous recirculation flow, even at steady-state conditions.

As an example, during steady-state conditions, the system may be operated in either the fourth mode with all the valves closed or in the second mode with only the first valve closed. As such, during steady-state operating conditions, a propensity for surge may be low and a surge margin may be sufficiently high. During these conditions, by holding one or more of the valves closed, energy consumption (in actuating the valves open) may be reduced. In one example, during steady-state boosted engine operation when the compressor operating point is sufficiently to the right of the surge line, the system may be operated in the fourth mode. Herein, due to a larger surge margin already available, the valves are kept closed. In another example, during steady-state boosted engine operation when the compressor operating point is close to the surge line, the system may be operated in the second mode. Herein, a small portion of recirculation flow through the second recirculation path is enabled to improve the surge margin.

During transients, an operating mode may be shifted. The transients may include, for example, a transient increase in engine airflow demand due to an operator pedal tip-in. As another example, the transients may include a transient decrease in engine airflow demand due to an operator pedal tip-out. As such, in each case, the transient change in engine airflow may lead to a change in the opening of throttle 20, and thereby a change in the mass flow through the throttle. For example, in response to a tip-out, operation may be shifted to first mode (with the first valve open) or third mode (with both valves open), while in response to a tip-in, operation may be shifted to the fourth mode (with both valves closed) or the second mode (with the first valve closed). In this way, flow through each of the first higher flow compressor recirculation path and the second lower flow compressor recirculation path may be adjusted based on a throttle mass flow to maintain a compressor flow rate at or above a threshold flow rate.

In one example, the second mode may be a default mode of the system that provides some surge margin, and a controller may adjust an opening of the valves and transition the system to one of the other modes based on changes in operating conditions that change throttle mass flow rates. Further, in some embodiments, second valve 72 may be omitted such that there may be at least some recirculation flow across the compressor, via the flow restriction, during all engine operating conditions.

Returning to FIG. 1, intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through wastegate 90, by-passing the turbine. The combined flow from the turbine and the wastegate then flows through emission control device 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow. All or part of the treated exhaust from emission control device 170 may be released into the atmosphere via exhaust conduit 35.

In some embodiments, the engine system may further configured for exhaust gas recirculation. In those embodiments, depending on operating conditions, a portion of the exhaust gas released from the cylinders may be diverted along an EGR passage (not shown) and via an EGR cooler to the compressor inlet, from downstream of the turbine. An EGR valve coupled to the EGR passage may be opened to admit a controlled amount of cooled exhaust gas to the compressor inlet for desirable combustion and emissions-control performance.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include an exhaust gas sensor located upstream of the emission control device, MAP sensor 124, exhaust temperature sensor 128, exhaust pressure sensor 129, compressor inlet temperature sensor 55, compressor inlet pressure sensor 56, compressor inlet humidity sensor 57, and air-fuel ratio sensor 126. Other sensors such as additional pressure, temperature, air/fuel ratio, and composition sensors may be coupled to various locations in engine system 100. The actuators 81 may include, for example, throttle 20, first and second compressor recirculation valves 62, 72, wastegate actuator 92, and fuel injector 66. The control system 14 may include a controller 12. The controller may receive input data from the various sensors, process the input data, and trigger various actuators in response to the processed input data based on instruction or code programmed therein corresponding to one or more routines. Example control routines are described herein with regard to FIG. 4.

Figure 4:
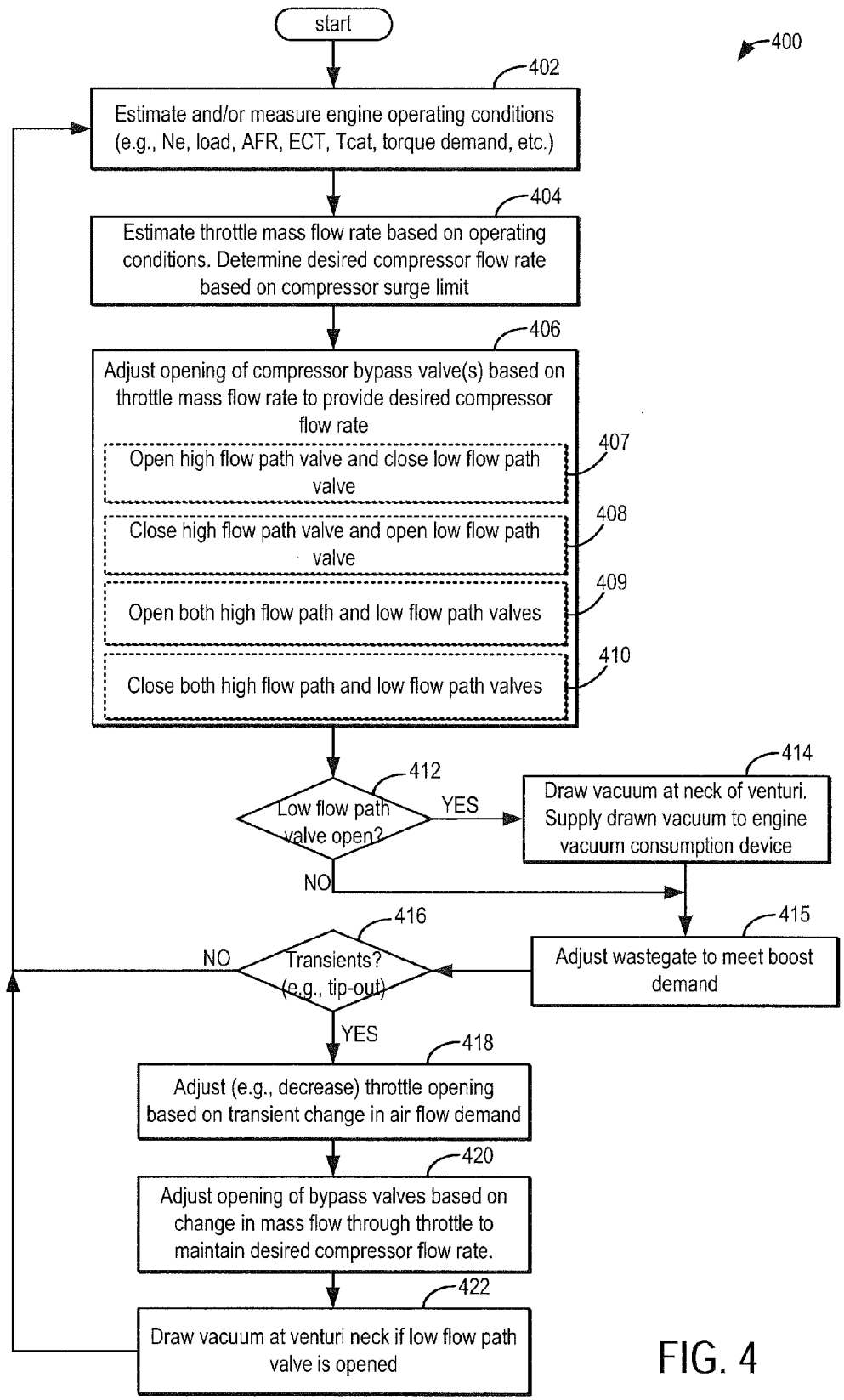
FIG. 4 shows a high level flow chart illustrating a routine that may be implemented for adjusting compressor recirculation flow in the engine system of FIGS. 1-2 to maintain compressor operation to the right of the hard and soft surge lines of FIG. 3.

Now turning to FIG. 4, example routine 400 depicts a method for adjusting the opening and closing of the first and second compressor recirculation valves to adjust flow through the first and second compressor recirculation paths, respectively, based on changes in throttle mass flow. The approach of routine 400 enables the compressor flow rate to be maintained at or above a flow rate at the hard surge line, thereby improving the margin to surge during substantially all engine operating conditions.

At 402, the routine includes estimating and/or measuring engine operating conditions. The estimated conditions may include, for example, engine speed, torque demand, boost pressure, MAP, MAF, engine temperature, combustion air-fuel ratio (AFR), exhaust catalyst temperature, ambient conditions (e.g., BP), etc.

At 404, the routine includes estimating the throttle mass flow based on operating conditions. For example, the throttle mass flow may be estimated based on a sensor output (e.g., MAP sensor output) or from desired throttle mass flow. In addition, a desired compressor flow rate (or threshold flow rate) may be estimated based on the throttle mass flow rate and a compressor surge limit. As such, the desired compressor flow rate (or threshold flow rate) may be a surge constrained compressor flow rate that is based on a hard surge limit of the compressor and that takes into account noise factors, such as part-to-part variability, that may affect the compressor state at which hard or soft surge occurs.

At 406, the routine includes adjusting an opening of one or more of the first and second compressor recirculation valves based on a difference between the throttle mass flow and the threshold mass flow rate to adjust a flow through the first (higher flow) compressor recirculation path and/or the second (lower flow) compressor recirculation path so as to maintain an actual compressor flow rate at or above the threshold flow rate. It will be appreciated that the estimating of the throttle mass flow and the desired compressor flow rate may be performed during all engine operating conditions including during steady-state and transient conditions. By continually estimating the throttle mass flow and adjusting a compressor recirculation flow in accordance to maintain the compressor flow rate at or above the desired compressor flow rate, the compressor state may be maintained outside of (specifically, to the right of) a hard surge and a soft surge region.

For example, the controller may select adjusting of each of the first and second valve when the difference (between the threshold flow rate/surge constrained compressor flow rate and the throttle mass flow rate) is higher than a threshold difference. Herein, the surge margin may be smaller and both valves may need to be opened to move the compressor state into the no surge region. As another example, the controller may select adjusting of one of the first and second valve when the difference (between the threshold flow rate/surge constrained compressor flow rate and the throttle mass flow rate) is smaller than the threshold difference. Herein, the surge margin may be larger and only one valve may need to be opened to move the compressor state into the no surge region. Further, given the lower flow through the second recirculation, path as the margin to surge increases, the only one valve selected may be the second valve, while as the margin to surge decreases, the only one valve selected may be the first valve. As such, the selecting may be performed during steady-state engine operating conditions before an indication of surge is received as well as during transient conditions. Further still, during transient conditions, the selecting may be further based on the change in throttle mass flow rate. For example, if the change in throttle mass flow rate is larger (e.g., during a tip-out where the pedal is displaced by a larger amount), the controller may select adjusting of each of the first and second valve. In comparison, if the change in throttle mass flow rate is smaller (e.g., during a tip-out where the pedal is displaced by a smaller amount), the controller may select adjusting of one of the first and second valve. Adjusting flow through one or more or each of the first compressor recirculation and second compressor recirculation paths may include adjusting one or more of the first on/off valve coupled in the first compressor recirculation path and the second on/off valve coupled in the second compressor recirculation path. As such, by opening the second valve, compressed airflow is flowed through the second recirculation path at a lower flow rate (due to the presence of a flow restriction) while opening of the first valve includes flowing compressed airflow through the first recirculation path at a higher flow rate (due to the absence of a flow restriction). The adjusting of the valves may include, for example, during a first condition, at 407, opening the first valve while closing the second valve (to operate in the first mode). As another example, during a second condition, at 408, the controller may open the second valve while closing the first valve (to operate in the second mode). As yet another example, during a third condition, at 409, the controller may open each of the first valve and the second valve (to operate in the third mode). Further still, during a fourth condition, at 410, the controller may close each of the first valve and the second valve (to operate in the fourth mode).

In one example, the controller may estimate the throttle mass flow rate based on the manifold pressure sensor or the desired throttle flow rate and calculate the surge constrained compressor flow rate based on the compressor's (hard) surge limit. The controller may then determine a desired compressor recirculation rate (that is, a net recirculation flow rate across the compressor via any combination of the first and second recirculation paths) based on a difference between the surge constrained compressor flow rate and the throttle mass flow rate. The controller may then select a mode of operation (e.g., select one of the four operating modes) wherein the compressor recirculation flow corresponds to the difference. At 412, it may be determined if the low flow path valve (the second valve) is open. If yes, then in embodiments where the second compressor recirculation path includes a venturi coupled downstream of the second valve, the routine includes (at 414), while flowing compressor flow through the second recirculation path, opportunistically drawing vacuum at the neck of the venturi and applying the drawn vacuum to an engine vacuum consumption device (such as a brake booster during vehicle braking or a fuel vapor canister during canister purging).

At 415, the wastegate is adjusted to maintain boost pressure so that torque demand can be bet. When either or both recirculation valves are opened, the wastegate can be moved in the closed direction to provide more turbine energy, resulting in additional boost. When one or both are closed, the wastegate can be moved in the more open direction to reduce turbine energy.

If the low flow path valve is not open at 412, or after drawing vacuum at the venturi at 414, the routine proceeds to 416 where it may be determined if there are any transients. In one example, transients may include a sudden change in engine airflow (and torque) demand due to an operator pedal position change (e.g., an operator pedal tip-out or tip-in). If a transient is confirmed, the routine proceeds to 418 to adjust the throttle opening based on the transient change in airflow demand. For example, where the transient is caused by an operator pedal tip-out, the throttle opening may be decreased responsive to the drop in engine airflow demand. As another example, where the transient is caused by an operator pedal tip-in, the throttle opening may be increased responsive to the rise in engine airflow demand. As such, the change in throttle opening may lead to a corresponding change in throttle mass flow. The controller may monitor the throttle and update (e.g., recalculate) the throttle mass flow rate based on the change in throttle opening.

At 420, the compressor recirculation flow may be revised in view of the change to the throttle mass flow rate so that the desired compressor flow rate can be maintained. For example, if the throttle mass flow rate increases due to the transient, the recirculation flow may be correspondingly decreased (e.g., by closing one or more of the first and second valves) so that the resulting compressor flow rate is at or above the surge constrained compressor flow rate. As another example, if the throttle mass flow rate decreases due to the transient, the recirculation flow may be correspondingly increased (e.g., by opening one or more of the first and second valves) so that the resulting compressor flow rate is at or above the surge constrained compressor flow rate. Further, if the second valve is opened in response to the transient, then at 422, as at 414, the compressor recirculation flow through the venturi can be opportunistically harnessed to draw a vacuum at the venturi, the drawn vacuum then stored or used to actuate one or more engine vacuum consumption devices.

From 422, or from 412, the routine returns to 402 to continue monitoring engine operating conditions and performing adjustments to the first and second compressor recirculation valves so as to maintain the compressor flow rate sufficiently high and thereby maintain the compressor state outside the surge region.

In one example, an engine system comprises an engine including an intake manifold, a throttle coupled to the intake manifold, a sensor coupled to the intake manifold for measuring a manifold pressure (MAP sensor), a compressor for compressing aircharge delivered to the intake manifold and a charge air cooler coupled downstream of the compressor and upstream of the throttle. The engine system may further include a first compressor recirculation path coupling an outlet of the charge air cooler to an inlet of the compressor, the first recirculation path including a first valve, as well as a second compressor recirculation path parallel to the first recirculation path and coupling the charge air cooler outlet to the compressor inlet, the second recirculation path including a second valve and a venturi located downstream of the second valve. A controller may be configured with computer readable instructions for, during steady-state operating conditions, operating with one or more of the first and second valve closed. Then, in response to a transient change in airflow, the controller may operate with one or more of the first and second valve open. The controller may select one or more of the first and second valve to open based on a throttle mass flow rate and a desired compressor flow rate, wherein the throttle mass flow rate is based on the sensor or desired value, and the desired compressor flow rate is based on a surge limit of the compressor.

The selecting may include, for example, if the throttle mass flow rate is higher than the desired compressor flow rate, operating with neither valve open, and if the throttle mass flow rate is lower than the desired compressor flow rate, operating with one of each or both of the first and second valve open. During conditions when the second valve is open, while flowing compressed air through the second recirculation path, a vacuum may be drawn at the venturi, the drawn vacuum then supplied to an engine vacuum consumption device.

Figure 5:
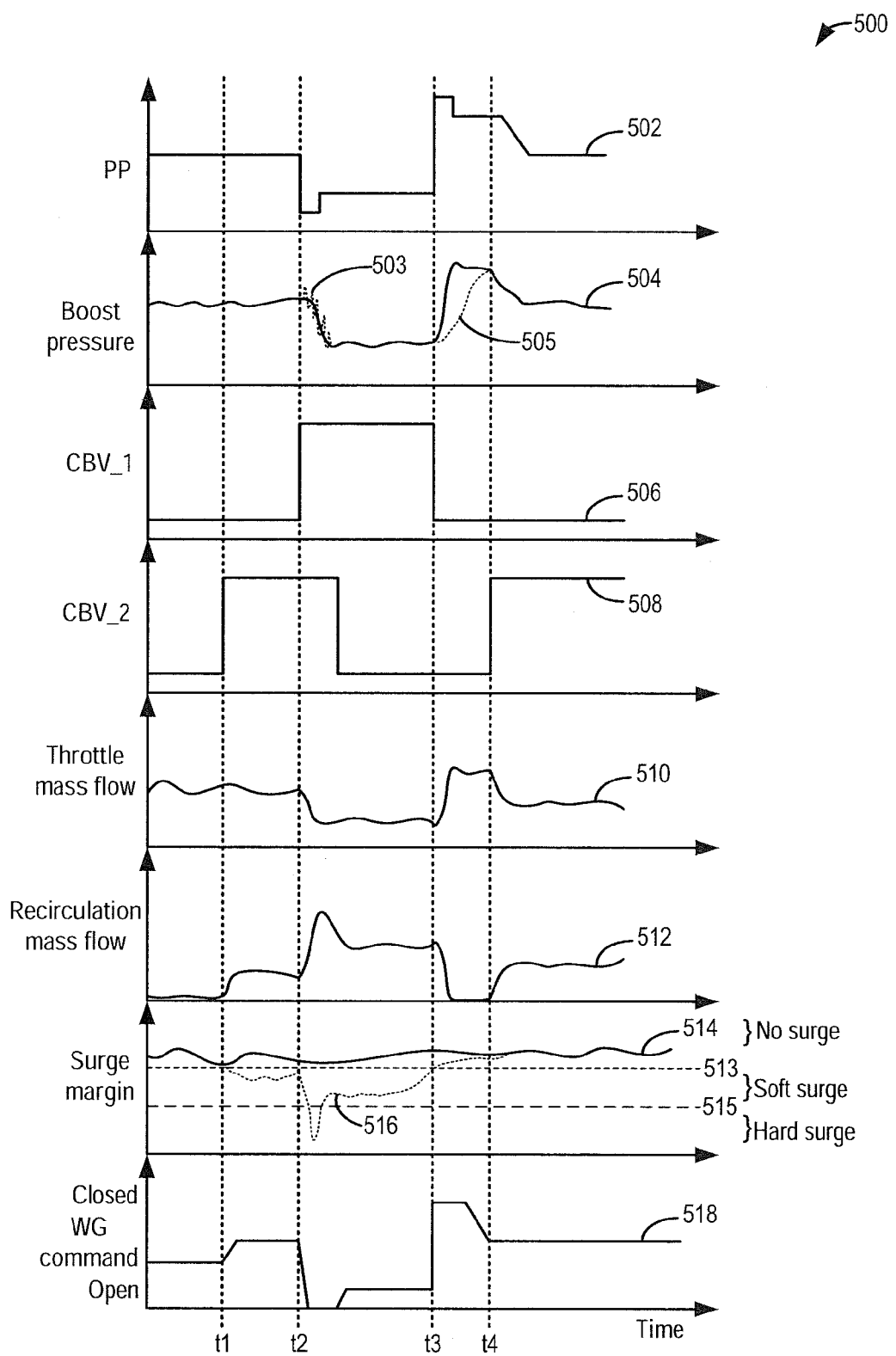
FIG. 5 shows example compressor recirculation valve adjustments during varying engine operating conditions, according to the present disclosure.

Now turning to FIG. 5, map 500 depicts an example adjustment to the opening of the first and second compressor recirculation valves based on changes in throttle mass flow to maintain the compressor out of the surge region. Map 500 depicts changes in an operator pedal position (PP) at plot 502, boost pressure at plot 504, opening/closing of the first valve (CBV_1) at plot 506, opening/closing of the second valve (CBV_2) at plot 508, changes in throttle mass flow at plot 510, changes in (net) compressor recirculation flow at plot 512 (that is, recirculation flow though the first and second valves), a surge margin at plot 514 and opening/closing of the wastegate at plot 518. All graphs are plotted over time of engine operation, along the x-axis.

Prior to t1, the engine may be at steady-state conditions with no major change in pedal position (plot 502). A throttle flow (plot 510) may be adjusted based on the torque demand so as to provide a requested boost pressure (504). In addition, at the operating conditions prior to t1, the margin to surge (plot 514) may be sufficient and the compressor state may be sufficiently above each of a hard surge limit 513 and a soft surge limit 515 such that the compressor state is in a no surge region (region above hard surge limit 513). During such condition, both the first high flow valve (CBV_1) in the first compressor recirculation path (plot 506) and the second low flow valve (CBV_2) in the second compressor recirculation path (plot 508) may be maintained closed. For example, the system may be operated in the fourth mode (discussed with reference to FIG. 4) where both the valves are closed. Consequently, an amount of recirculation flow (plot 512) may be negligible. As such, before t1, a flow rate through the compressor may be at or above a desired level, in particular, above a surge constrained compressor flow rate (as indicated by the compressor state being in the no surge region).

At t1, due to a change in engine operating conditions (e.g., change in ambient conditions, or altitude), the surge margin may correspondingly decrease, and the compressor state may start to move towards the soft surge region (between limits 513 and 515). In response to this change, at t1, the controller may open the second valve while maintaining the first valve closed so as to increase compressor recirculation flow by a small amount. The wastegate is moved in the closed direction to maintain boost pressure as shown by 518. For example, the system may be operated in a mode (e.g., the second mode discussed with reference to FIG. 4) where only the second valve is opened and the first valve is closed. By increasing the recirculation flow, the compressor flow rate is increased to above the surge constrained level and the compressor state can be maintained in the no surge region. As such, if the second valve was not opened, at t1, the surge margin may reduce and the compressor may move into the soft surge region, as shown by dotted line 516.

At t2, an operator pedal tip-out event may occur. As a result of the drop in torque demand, and the corresponding drop in airflow demand, a throttle opening may be decreased. Consequently, the throttle mass flow may drop. Herein, to maintain the compressor in the no surge region with the compressor flow rate above the surge constrained level, at t2, while the second valve is open, the first valve may also be opened to increase compressor recirculation flow by a larger amount. The wastegate is moved in the open direction in response to the lower boost demand. For example, the system may be operated in the third mode where both the first and second valves are open. By increasing the recirculation mass flow in response to the drop in throttle mass flow, the compressor flow rate is kept above the surge constrained level and the compressor state can be maintained in the no surge region. As such, if the first valve were not opened at t2, the surge margin may reduce and the compressor may transiently move into a hard surge region (below limit 515), as shown by dotted line 516. In addition, frequent and large amplitude boost pressure oscillations may be experienced due to the hard surge condition, as shown by dotted segment 503.

After the pedal tip-out at t2, the boost pressure may gradually stabilize to a lower level of boost (based on the reduced torque demand) and the engine may once again be in steady-state conditions. After the propensity for hard surge is addressed at t2 by opening both the first and second valves, the recirculation flow is adjusted to meet the surge margin needs at the new operating condition and the wastegate is adjusted to meet the boost demand. For example, the system may be operated in the first mode where only the first valve is open and the second valve is closed. In an alternate example (not shown), the first valve may also be closed and the system may return to the fourth mode.

When holding one or both valves open while maintaining the compressor state outside the surge regions after the tip-out with sufficient boost pressure downstream of the compressor, boost can be rapidly increased during a subsequent tip-in. In the depicted example, at t3, an operator pedal tip-in event may be confirmed. In response to the tip-in, a throttle opening may be increased and the wastegate closed to meet the increased engine airflow demand. In addition, by quickly closing the first valve, which was open, the boost pressure can be rapidly increased. As such, if any of the both recirculation valves were closed prior to t3, the rise in boost pressure may be slower and a boost delay may be experienced, as shown at dotted segment 505.

At t4, after the pedal tip-in at t3, the pedal demand may gradually decrease and the boost pressure may gradually stabilize to a lower level of boost (as based on the gradually reduced torque demand). Thus after t4, the engine may once again be in steady-state conditions. Herein, after the desired boost pressure is provided by maintaining both the first and second valves closed, the first valve is maintained closed. In the depicted example, the second valve is opened during the steady state condition following t4 to provide an increased surge margin. In particular, due to the small reduction in throttle mass flow after t4, the second valve is opened to provide a small increase in recirculation flow so that the compressor flow rate can be maintained above the surge constrained flow rate. Again the wastegate is adjusted to deliver the boost demand. For example, the system may be returned to the second mode where only the second valve is open and the first valve is closed. In alternate example, the second valve may also be maintained closed after t4. In this way, adjustments to each of the first and second compressor recirculation valve may be continuously made, during steady-state and transient conditions, responsive to changes in throttle mass flow, so that a flow rate through the compressor can be maintained sufficiently high.

In this way, flow through multiple parallel compressor recirculation paths can be adjusted based on changes to throttle mass flow so that a flow rate through a compressor remains above a surge constrained level during all engine operating conditions. By adjusting the recirculation flow during steady-state and transient conditions, a compressor state may be maintained in a no surge region for a substantial portion (e.g., entire duration) of engine operation. The approach not only addresses hard surge but also reduces the frequency of engine operation in a soft surge region. By using a combination of adjustments to a high flow and a low flow compressor recirculation path, a larger range of recirculation flow control is enabled. By improving the surge margin, surge occurrence and surge related NVH issues and component damage issues are reduced. Overall, driveability and engine performance is improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
adjusting flow through each of a first higher flow compressor recirculation path and a second lower flow compressor recirculation path based on a throttle mass flow rate to maintain a compressor flow rate at or above a threshold flow rate, estimating the threshold flow rate based on a compressor surge limit, and the second recirculation path positioned in parallel to the first recirculation path.

2. The method of claim 1, wherein each of the first and second compressor recirculation paths recirculate compressed airflow from downstream of a charge air cooler and upstream of an intake throttle to a compressor inlet.

3. The method of claim 2, wherein adjusting flow through each of the first compressor recirculation and second compressor recirculation paths includes adjusting one or more of a first on/off valve coupled in the first recirculation path and a second on/off valve coupled in the second recirculation path.

4. The method of claim 3, wherein the second lower flow recirculation path includes a flow restriction downstream of the second valve.

5. The method of claim 4, wherein the flow restriction is an orifice.

6. The method of claim 4, wherein the flow restriction is a venturi.

7. The method of claim 4, wherein the adjusting includes, during steady-state and transient conditions, estimating a desired throttle mass flow rate and adjusting an opening of the first valve and the second valve based on a difference between the throttle mass flow rate and the threshold flow rate.

8. The method of claim 7, wherein adjusting one or more of the first and second valves includes, selecting adjusting of each of the first and second valves when the difference is larger than a threshold difference, and selecting adjusting of one of the first and second valves when the difference is smaller than the threshold difference.

9. The method of claim 7, wherein adjusting one or more of the first and second valves includes,
opening the first valve while closing the second valve during a first condition;
opening the second valve while closing the first valve during a second condition;
opening each of the first valve and the second valve during a third condition; and
closing each of the first valve and the second valve during a fourth condition.

10. The method of claim 6, further comprising, while flowing compressor flow through the second recirculation path, drawing vacuum at a neck of the venturi, and applying the drawn vacuum to a fuel vapor canister during purging conditions and/or to a brake booster during vehicle braking.

11. A method for a boosted engine, comprising:
operating in a first mode with a first valve coupled to a first compressor recirculation path open and a second valve coupled to a second compressor recirculation path closed, the second recirculation path positioned in parallel to the first recirculation path;
operating in a second mode with the first valve closed and the second valve open;
operating in a third mode with each of the first and second valves open;
operating in a fourth mode with each of the first and second valves closed; and
selecting between the modes based on a desired compressor recirculation flow rate, wherein the desired compressor recirculation flow rate is based on a throttle mass flow rate and a compressor surge limit.

12. The method of claim 11, wherein selecting based on the desired compressor recirculation rate includes estimating the throttle mass flow rate, calculating a surge constrained compressor flow rate based on the compressor surge limit, determining the desired compressor recirculation rate based on a difference between the surge constrained compressor flow rate and the throttle mass flow rate, and selecting a mode where compressor recirculation flow corresponds to the difference.

13. The method of claim 12, wherein the selecting further includes selecting during steady-state engine operating conditions before an indication of surge is received.

14. The method of claim 12, wherein the selecting is further based on a change in throttle mass flow rate during a transient engine operating condition.

15. The method of claim 11, wherein each of the first and second compressor recirculation paths recirculate compressed airflow from downstream of a charge air cooler and upstream of an intake throttle to a compressor inlet, and wherein the second recirculation path includes a flow restriction, the flow restriction including one of an orifice and a venturi.

16. The method of claim 15, wherein opening the second valve includes flowing compressed airflow through the second recirculation path at a lower flow rate and wherein opening the first valve includes flowing compressed airflow through the first recirculation path at a higher flow rate.

17. An engine system, comprising:
an engine including an intake manifold;
a throttle coupled to the intake manifold;
a sensor coupled to the intake manifold for estimating a manifold air flow;
a compressor for compressing aircharge delivered to the intake manifold;
a charge air cooler coupled downstream of the compressor and upstream of the throttle;
a first compressor recirculation passage coupling an outlet of the charge air cooler to an inlet of the compressor, the first recirculation passage including a first valve;
a second compressor recirculation passage parallel to the first recirculation passage and coupling the charge air cooler outlet to the compressor inlet, the second recirculation passage including a second valve and a venturi located downstream of the second valve; and
a controller with computer readable instructions for:
during steady-state operating conditions,
operating with one or more of the first and second valves closed; and
in response to a transient change in airflow,
operating with one or more of the first and second valves open; and
selecting one or more of the first and second valves to open based on a throttle mass flow rate and a desired compressor flow rate, the throttle mass flow rate based on the sensor, the desired compressor flow rate based on a surge limit of the compressor.

18. The system of claim 17, wherein the selecting includes, if the throttle mass flow rate is higher than the desired compressor flow rate, operating with only the second valve open, and if the throttle mass flow rate is lower than the desired compressor flow rate, operating with each of the first and second valves open.

19. The system of claim 17, wherein the controller includes further instructions for,
during conditions when the second valve is open, while flowing compressed air through the second recirculation passage, drawing a vacuum at the venturi; and supplying the drawn vacuum to an engine vacuum consumption device.

* * * * *